United States Patent
Jeong et al.

(10) Patent No.: US 10,545,754 B2
(45) Date of Patent: Jan. 28, 2020

(54) APPLICATION HOT DEPLOY METHOD TO GUARANTEE APPLICATION VERSION CONSISTENCY AND COMPUTER PROGRAM STORED IN COMPUTER READABLE MEDIUM THEREFOR

(71) Applicant: TMAXSOFT CO., LTD., Seongnam-si, Gyeonggi-do (KR)

(72) Inventors: Junsoo Jeong, Seongnam-si (KR); Yujeong Ha, Seongnam-si (KR); Chanpyo Hong, Cheongju-si (KR)

(73) Assignee: TMAXSOFT CO., LTD., Seongnam-si (KR)

(*) Notice: Subject to any disclaimer, the term of this patent is extended or adjusted under 35 U.S.C. 154(b) by 0 days.

(21) Appl. No.: 16/020,377

(22) Filed: Jun. 27, 2018

(65) Prior Publication Data

US 2019/0391803 A1 Dec. 26, 2019

(30) Foreign Application Priority Data

Jun. 22, 2018 (KR) .................. 10-2018-0072310

(51) Int. Cl.
  *G06F 9/44* (2018.01)
  *G06F 8/656* (2018.01)
  (Continued)

(52) U.S. Cl.
  CPC ............ *G06F 8/656* (2018.02); *G06F 8/71* (2013.01); *G06F 9/445* (2013.01); *G06F 9/5022* (2013.01); *G06F 16/219* (2019.01)

(58) Field of Classification Search
  CPC .......... G06F 8/656; G06F 8/71; G06F 16/219; G06F 9/5022
  (Continued)

(56) References Cited

U.S. PATENT DOCUMENTS 6,701,334 B1   3/2004  Ye et al.
9,419,857 B1 * 8/2016  Ryan .................. H04L 63/08
(Continued)

FOREIGN PATENT DOCUMENTS

JP  2004086769 A  3/2004
JP  2005202573 A  7/2005
(Continued)

OTHER PUBLICATIONS

Title: Component-based version management for embedded computing system design, author: Tien N. Nguyen, source ACM digital library, published on Mar. 2007.*
(Continued)

*Primary Examiner* — Chameli Das
(74) *Attorney, Agent, or Firm* — Umberg Zipser LLP

(57) ABSTRACT

According to an exemplary embodiment of the present disclosure, disclosed is a method for seamless application version management in a system including a plurality of application servers. Procedures stored in a computer program for processing the above-mentioned method include: transmitting held application version information to an application management server, receiving an updated version of an application file and version information corresponding to the application file from the application management server; determining that it is possible to perform a service using the updated version of an application by loading the updated version of the application file; transmitting application update readiness information to the application management server when it is determined that it is possible to perform the service using the updated version of the application; and receiving a command to apply the updated version from the application management server.

6 Claims, 13 Drawing Sheets

(51) Int. Cl.
*G06F 9/50* (2006.01)
*G06F 8/71* (2018.01)
*G06F 16/21* (2019.01)
*G06F 9/445* (2018.01)

(58) Field of Classification Search
USPC .......................................................... 717/168
See application file for complete search history.

(56) References Cited

U.S. PATENT DOCUMENTS

| | | |
|---|---|---|
| 2004/0215755 A1 | 10/2004 | O'Neill |
| 2007/0074201 A1 | 3/2007 | Lee |
| 2012/0102199 A1* | 4/2012 | Hopmann ............. G06F 9/5044 709/226 |
| 2013/0036092 A1 | 2/2013 | Lafont et al. |
| 2015/0149990 A1* | 5/2015 | Nakamura ................ G06F 8/65 717/171 |
| 2015/0154025 A1* | 6/2015 | Tanimura ................. G06F 8/60 712/229 |
| 2015/0347121 A1* | 12/2015 | Harumoto .............. G01C 21/32 717/172 |
| 2017/0262277 A1* | 9/2017 | Endo ....................... G06F 8/658 |
| 2017/0300316 A1* | 10/2017 | Lopyrev .............. H04L 67/1097 |
| 2018/0060064 A1* | 3/2018 | Okamoto .................. G06F 8/71 |
| 2018/0267794 A1* | 9/2018 | Atchison .................. F24F 11/32 |
| 2018/0324561 A1* | 11/2018 | Chiussi ................... H04W 4/12 |

FOREIGN PATENT DOCUMENTS

| | | |
|---|---|---|
| KR | 1020020035558 | 5/2002 |
| KR | 1020030071750 | 9/2003 |
| KR | 1020070034239 | 3/2007 |
| KR | 1020140035103 | 11/2014 |
| KR | 1020170003566 U | 10/2017 |

OTHER PUBLICATIONS

Korea Intellectual Property Office, Office Action, dated Oct. 7 2019; 6 pgs.

* cited by examiner

APPLICATION HOT DEPLOY METHOD TO GUARANTEE APPLICATION VERSION CONSISTENCY AND COMPUTER PROGRAM STORED IN COMPUTER READABLE MEDIUM THEREFOR

CROSS-REFERENCE TO RELATED APPLICATIONS

This application claims priority to and the benefit of Korean Patent Application No. 10-2018-0072310 filed in the Korean Intellectual Property Office on Jun. 22, 2018, the entire contents of which are incorporated herein by reference.

TECHNICAL FIELD

The present disclosure relates to a method for consistency of an application program version in application hot deployment and a computer program stored in a computer readable medium, and more particularly, to a method for consistency of an application program version in a distributed environment.

BACKGROUND ART

According to the hot deployment, an updated version of application is deployed to a server without stopping the server so that the updated version of application may be applied to an application server which processes a service without causing the interruption of the service of users. A plurality of servers is operated in a distributed environment and the service is also processed in the plurality of servers.

A time when the application is applied may vary for every server, depending on the order of deploying an updated version of application to the servers. When a latest version is requested for a service to a server to which the updated version of application is not applied, an error may be incurred or an incorrect result may be returned.

There is a problem in that if an older version of application remains after deploying the updated version of application, the memory may be insufficient.

Therefore, there are demands on a method of matching the consistency of the application to the updated version in the distributed environment and a method of removing a version of application resource before being updated, in the art.

Korean Patent No. KR20027000225 discloses a method of loading a class related to an application program.

SUMMARY

An object to be achieved by the present disclosure is to provide a seamless application version management method.

According to an exemplary embodiment of the present disclosure which embodies the above-described object, there is provided a computer program stored in a computer readable storage medium, in which when the computer program is executed by one or more processors of an application server, the computer program performs the following procedures for seamless application version management of a system including a plurality of application servers, and the procedures include: transmitting held application version information to an application management server, receiving an updated version of an application file and version information corresponding to the application file from the application management server; determining that it is possible to perform a service using the updated version of an application by loading the updated version of the application file; transmitting application update readiness information to the application management server when it is determined that it is possible to perform the service using the updated version of the application; and receiving a command to apply the updated version from the application management server.

According to alternative exemplary embodiment of the procedures of the computer program to execute the following procedures for seamless application version management in a system including a plurality of application servers, the command to apply an updated version may be generated in the application management server when the application update readiness information is received from all the application servers of the system including the plurality of application servers to the application management server.

According to an alternative exemplary embodiment of the procedures of the computer program to execute the following procedures for seamless application version management in a system including a plurality of application servers, when the application of updated version fails, the procedures may further include transmitting application failure information of the updated version to the application management server, receiving a command to cancel the application of an updated version from the application management server, and performing a service using an older version of the application of the updated version.

According to an alternative exemplary embodiment of the procedures of the computer program to execute the following procedures for seamless application version management in a system including a plurality of application servers, when a command to apply an updated version is received from the application management server, the procedure may further include: determining the updated version of the application as a latest version; and performing a service after receiving the command to apply an updated version using the updated version of the application.

According to an alternative exemplary embodiment of the procedures of the computer program to execute the following procedures for seamless application version management in a system including a plurality of application servers, the procedures may further include receiving a service from another application server, performing the service using a version of the application identified based on the version information of the service when there is version information in the service or performing the service using a latest version of the application when there is no version information in the service.

According to an exemplary embodiment of the present disclosure which embodies the above-described object, a method for seamless application version management in a system including a plurality of application servers includes: transmitting held application version information to an application management server, receiving an updated version of an application file and version information corresponding to the application file from the application management server; determining that it is possible to perform a service using the updated version of an application by loading the updated version of the application file; transmitting application update readiness information to the application management server when it is determined that it is possible to perform the service using the updated version of the application; and receiving a command to apply the updated version from the application management server.

According to an exemplary embodiment of the present disclosure which embodies the above-described object, an application server for seamless application version management in a system including a plurality of application servers includes: a processor including one or more cores; and a memory and the processor is configured to transmit held application version information to an application management server, receive an updated version of an application file and version information corresponding to the application file from the application management server; determine that it is possible to perform a service using the updated version of an application by loading the updated version of the application file; transmit application update readiness information to the application management server when it is determined that it is possible to perform the service using the updated version of the application; and receive a command to apply the updated version from the application management server.

According to an exemplary embodiment of the present disclosure which embodies the above-described object, there is provided a computer program stored in a computer readable storage medium, in which when the computer program is executed by one or more processors of an application server, the computer program performs the following procedures for seamless application version management of a system including a plurality of application servers, and the procedures include: recording service performance related information for every version of a plurality of versions of an application stored in the application server; transmitting at least one of held application version information, the service performance related information for every version, and version information of an application by which the service is being performed to an application management server; transmitting unused version information including version information of an application by which no service is being performed to the application management server when there is no service which is performed by an application of a version which is not a latest version, among the plurality of versions of the application, based on the service performance related information for every version; and receiving a command to remove an unused version from the application management server.

According to an alternative exemplary embodiment of the procedures of the computer program to execute the following procedures for seamless application version management in a system including a plurality of application servers, the procedure may further include determining a version of an application identified based on the command to remove an unused version to be a removal standby state when the command to remove an unused version is received.

According to an alternative exemplary embodiment of the procedures of the computer program to execute the following procedures for seamless application version management in a system including a plurality of application servers, the procedures may further include transmitting unused version removal readiness information for a version of an application identified based on the command to remove an unused version to the application management server, when the command to remove an unused version is received.

According to an alternative exemplary embodiment of the procedures of the computer program to execute the following procedures for seamless application version management in a system including a plurality of application servers, the command to remove an unused version may be generated based on the unused version information in the application management server when unused version information of the same version of an application is received from all application servers of a system including the plurality of application servers to the application management server.

According to an alternative exemplary embodiment of the procedures of the computer program to execute the following procedures for seamless application version management in a system including a plurality of application servers, the procedures may further include terminating an instance for a version of an application identified based on the unused version information and retrieving an allocated main memory.

According to an alternative exemplary embodiment of the procedures of the computer program to execute the following procedures for seamless application version management in a system including a plurality of application servers, the procedure may further include terminating an instance for a version of an application identified based on the command to remove an unused version and retrieving an allocated main memory when the command to remove an unused version is received.

According to an alternative exemplary embodiment of the procedures of the computer program to execute the following procedures for seamless application version management in a system including a plurality of application servers, the procedures may further include: receiving a command to confirm the removal of an unused version from the application management server; terminating an instance for a version of an application which is identified based on the command to confirm the removal of an unused version and retrieving an allocated main memory when the command to confirm the removal of an unused version is received from the application management server; and deleting a version of application identified based on the command to confirm the removal of an unused version from a storage medium.

According to an alternative exemplary embodiment of the procedures of the computer program to execute the following procedures for seamless application version management in a system including a plurality of application servers, the command to confirm the removal of an unused version may be generated based on the unused version removal readiness information in the application management server when unused version removal readiness information of the same version of application is received from all application servers of a system including the plurality of application servers to the application management server.

According to an alternative exemplary embodiment of the procedures of the computer program to execute the following procedures for seamless application version management in a system including a plurality of application servers, the procedures may further include: determining whether a service which is performed by a version of an application identified based on the command to remove an unused version is to be transmitted to another application server when the command to remove an unused version is received; and transmitting version unremovable information of a version of an application identified based on the command to remove an unused version to the application management server when the service performed by a version of the application identified based on the command to remove an unused version is transmitted to the another application server.

According to an exemplary embodiment of the present disclosure which embodies the above-described object, a method for seamless application version management in a system including a plurality of application servers includes: recording service performance related information for every version of a plurality of versions of an application stored in the application server; transmitting at least one of held application version information, the service performance related information for every version, and version information of an application by which the service is being performed to an application management server; transmitting unused version information including version information of an application by which no service is being performed to the application management server when there is no service which is performed by an application of a version which is not a latest version, among the plurality of versions of an application, based on the service performance related information for every version; and receiving a command to remove an unused version from the application management server.

According to an exemplary embodiment of the present disclosure which embodies the above-described object, an application server for seamless application version management in a system including a plurality of application servers includes: a processor including one or more cores; and a memory, and the processor is configured to record service performance related information for every version of a plurality of versions of an application stored in the application server; transmit at least one of held application version information, the service performance related information for every version, and version information of an application by which the service is being performed to an application management server; transmit unused version information including version information of an application by which no service is being performed to the application management server when there is no service which is performed by an application of a version which is not a latest version, among the plurality of versions of application, based on the service performance related information for every version; and receive a command to remove an unused version from the application management server.

According to the present disclosure, a seamless application version management method may be provided.

DETAILED DESCRIPTION

Figure 1:
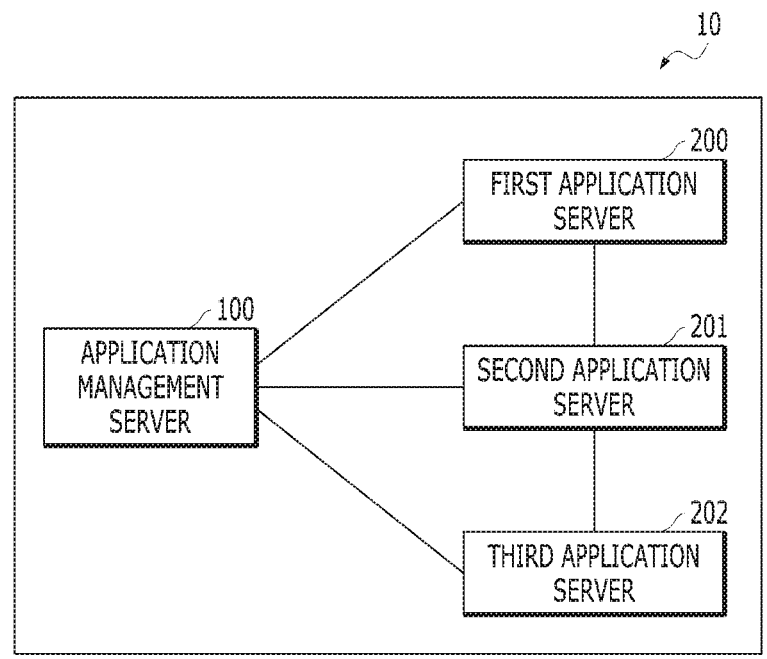
FIG. 1 is a schematic view illustrating a system for performing a procedure for seamless version management of an application according to an exemplary embodiment of the present disclosure.

Various exemplary embodiments will now be described with reference to the drawings. In the specification, various descriptions are suggested to provide understanding of the present disclosure. However, it is obvious that the exemplary embodiments may be embodied without having the specific description.

Terminologies such as "component', "module", or "system" used in the specification indicate a computer-related entity, hardware, firmware, software, a combination of software and hardware, or execution of software. For example, a component may be a processing step which is executed in a processor, a processor, an object, an execution thread, a program and/or a computer, but is not limited thereto. For example, both an application which is executed in a computing device and a computing device may be a component. One or more components may be stayed within the processor and/or execution thread. One component may be localized in one computer. One component may be distributed between two or more computers. Such components may be executed from various computer readable media having various data structures stored therein. The components may communicate with each other through local and/or remote processings in accordance with a signal (for example, data transmitted through other system and a network such as Internet through data and/or a signal from one component which interacts with other component in a local system or a distributed system) having one or more data packets.

A term "or" is intended to refer to not exclusive "or", but inclusive "or". That is, when it is not specified or unclear on the context, "X uses A or B" is intended to mean one of natural inclusive substitutions. That is, when X uses A; X uses B; or X uses both A and B, "X uses A or B" may be applied to any of the above instances. Further, it should be understood that the term "and/or" used in this specification designates and includes all available combinations of one or more items among listed related items.

The term "comprise" and/or "comprising" is understood that the corresponding feature and/or component are present. However, it should be understood that a term "include" and/or "including" does not preclude existence or addition of one or more other features, constituent elements and/or these groups. Further, when it is not separately specified or it is not clear from the context to indicate a singular form, the singular form in the specification and the claims is generally interpreted to represent "one or more".

Those skilled in the art will further appreciate that the various illustrative logical blocks, configurations, modules, circuits, means, logics, and algorithm steps described in connection with the embodiments disclosed herein may be implemented as electronic hardware, computer software, or combinations thoseof. To clearly illustrate the interchangeability of hardware and software, various illustrative components, blocks, configurations, means, logics, modules, circuits, and steps have been described above generally in terms of their functionality. Whether the functionality is implemented as hardware or software depends on a specific application and design constraints imposed on the overall system. Those skilled in the art may implement the described functionality in various ways for each of specific applications. However, decisions of such implementations should be interpreted without departing from the scope of the present disclosure.

Description of the suggested exemplary embodiments is provided to allow those skilled in the art to use or embody the present disclosure. Various modifications to these embodiments may be apparent to those skilled in the art. Generic principles defined herein may be applied to other embodiments without departing from the scope of the present disclosure. Therefore, the present disclosure is not limited to the embodiments suggested herein. The present disclosure needs to be interpreted within the broadest scope consistent with principles suggested herein and novel features. In one exemplary embodiment of the present disclosure, the server may include other configurations for performing a server environment. The server may include any type of devices. The server may be digital equipment having an arithmetic capacity such as a laptop computer, a notebook computer, a desktop computer, a web pad, and a mobile phone in which a processor is mounted and a memory is equipped. The server may be a web server which processes the service. The type of server described above is only an example and the present disclosure is not limited thereto.

FIG. 1 is a schematic view illustrating a system for performing a procedure for seamless version management of an application according to an exemplary embodiment of the present disclosure. In the present specification, an application management server 100 is installed in each of a plurality of application servers 200 and performs procedures for management of a version of an application used for a service. The application management server 100 deploys an updated version of application to each of the plurality of application servers 200 and may instruct each of the plurality of application servers 200 to remove an unused version of application. The application server 200 is a server which processes a request for a service. The application server 200 may solely process one service. A plurality of servers may be operated in a distributed environment. In the distributed environment, the resources may be divided and distributed to the plurality of applications. In the distributed environment, the plurality of application servers 200 may process one service together.

A configuration of the system 10 illustrated in FIG. 1 is just a simplified example. Even though in FIG. 1, it is illustrated that three applications are provided, it is just an example and the number of application servers and the number of application management servers are not limited thereto.

The system 10 processes the service using the servers included in the system. The service may be performed using the application held by the application server 200. The system 10 may include one or more application servers 200 which perform the service using an application and an application management server 100 which manages a version of an application of all the application servers 200.

The application server 200 may transmit version information of the held application to the application management server 100. The held application may include all applications which are stored or installed in the application server 200 or installed to process the service. Version information of the held application may include version information of each application in each state.

When a hot deployment command is received from a management system (not illustrated), the application management server 100 may transmit an updated version of application file and version information corresponding to the application file to each of the plurality of application servers 200. The version information is information for identifying the version of application and may be configured by a unique value to each version. The version information may be issued one by one from the application management server 100 whenever the application management server 100 performs hot deploy to transmit the updated version of application file to each of the plurality of application servers 200. The version information issued by the application management server 100 does not overlap other version information. The application management server 100 and the application server 200 may distinguish various versions of application files through version information. For example, when the updated version of application file is an interest calculating logic for a loan interest, whenever an application file for the interest calculating logic for a loan interest is transmitted to the application server 200, the application management server 100 may issue new version information. When version information of the interest calculating logic for yesterday's loan interest is 1 and version information of the interest calculating logic for today's loan interest is 2, the application management server 100 and the plurality of application servers 200 may distinguish the date of the loan interest to be calculated by the interest calculating logic through the version information.

The updated version of application file which is transmitted to each of the plurality of application servers 200 by the application management server 100 may include all information of a new version of application to be deployed or include information to which only a difference of a new version of application to be deployed and a version of previously deployed application is reflected.

The application server 200 may store the updated version of application file received from the application management server 100 and version information corresponding to the application file in a separate storage for every version. When the updated version is requested for a service, the application server 200 may load the updated version of application file so as to process the service with the updated version. When the received updated version of application file is loaded to process the service, the application server 200 may transmit application update readiness information to the application management server 100.

When information of ready to update the same version of application is received from all the plurality of application servers 200, the application management server 100 may transmit a command to apply the updated version of application to each of the plurality of application servers 200.

When the command to apply the updated version is received from the application management server 100, the application server 200 may determine the updated version of application as the latest version. The application server 200 may perform a service which is received thereafter using the updated latest version of application. When a service is received, the application server 200 may assign version information of application by which the service is performed. Until the service is completed, the service may be performed by a version of application which is assigned from the application server 200 at first time. That is, one service may be processed by one version of application for the purpose of consistency of the service processing. When a first application service 200 receives the service from a second application server 201, it may be determined whether there is version information in the received service. When there is version information in the service received from the second application server 201, the first application server 200 may perform the service with the corresponding version. When there is no version information in the service received from the second application server 201, the first application server 200 may perform the service by the latest version of application.

When the application fails due to a problem generated during a process of determining the updated version of application as a latest version, the application server 200 may determine that the applying of the updated version fails. When the application of the updated version fails, the application server 200 may transmit information on the application failure of the updated version to the application management server 100.

When the information on the application failure of the updated version is received from at least one of the plurality of application servers 200, the application management server 100 may generate a command to cancel the application of the updated version. The application management server 100 may transmit the command to cancel the application of the updated version to each of the plurality of application servers 200.

When the command to cancel the application of the updated version is received from the application management server 100, the application server 200 may cancel the determination of the updated version of application as a latest version. The application server 200 may perform a service which is received thereafter using a version of application before being updated.

The application management server 100 may store whether the updated version of application is successfully deployed. Among the application servers 200, a server which is stopped due to the problem generated during the process of determining the updated version of application as a latest version may check whether the latest version of application and the transmitted applications are used, to the application management server 100, at the time of being restarted. Among the application servers 200, a server which is stopped due to the problem generated during the process of determining the updated version of application as a latest version may apply or cancel the application of the updated version of held application file. The application server 200 which is restarted after stopping may request the version information of an application which is currently being used and the application file to the application management server 100.

The version consistency of the application which processes the service in the plurality of application servers 200 may be maintained using a version management method for the plurality of application servers 200 of the exemplary embodiment of the present disclosure. An error which may be incurred when the plurality of application servers 200 processes the service may be prevented by maintaining the version consistency of the application which processes the service in the application server 200 so that the service processing performance of the plurality of application servers 200 may be improved. An error which may be incurred when the plurality of application servers processes the service may be prevented by maintaining the version consistency of the application which processes the service in the application server 200 so that the reliability for the service processing of the plurality of application servers 200 may be improved.

The application server 200 may record information on a plurality of versions of application which is stored in a separate storage to be managed. The application server 200 may record information on which service is performed for every version of applications which are stored in a separate storage to be managed. The application server 200 may transmit version information of the held application to the application management server 100. For example, the application server 200 may transmit version information indicating that version 1, version 2, and version 3 of an application A are held, to the application management server 100. The application server 200 may transmit information indicating which service is performed for every version to the application management server 100. For example, the application server 200 may transmit information indicating that there is no service which is performed with version 1, service 1 and service 2 are performed with version 2, and service 3 is performed with version 3, to the application management server 100. The application server 200 may transmit version information of the application which is performing the service, to the application management server 100. For example, information indicating that the service is being performed with version 2 and version 3 is transmitted to the application management server 100. The application server 200 may determine whether there is a service which is performed by an application having a version other than the latest version, among the plurality of versions of application, based on service performance related information for every version. The application management server 100 may identify a version with which the service is not performed in the plurality of application servers 200 based on the service performance information for every version. The application server 200 may determine a version of the application by which the service is not performed as an unused version. The application server 200 may transmit unused version information to the application management server 100. The application server 200 terminates an instance for a version of application which is identified based on the unused version information and retrieves an allocated main memory. The instance may be executing an application file to process the service with the corresponding version in the application server. The application server 200 may remove the version of application which is identified based on the unused version information from the main memory. The application server 200 may maintain the version of application identified based on the unused version information in a hard disk which is an auxiliary storage device without completing the installation and the storage.

When unused version information for the same version of application is received to the application management server 100 from all the application servers 200, the application management server 100 may generate a command to remove an unused version based on the unused version information. The application management server 100 may transmit the command to remove an unused version to all the application servers 200.

The application server 200 may receive the command to remove an unused version from the application management server 100. The application server 200 may determine the version of application identified based on the received command to remove an unused version to be a removal standby state. When a command to confirm the removal of an unused version is received thereafter from the application management server 100, the version of application which is determined to be a removal standby state may be deleted from the storage medium. The application server 200 terminates an instance for a version of application which is identified based on the received command to remove an unused version and retrieves an allocated main memory. The instance may be executing an application file to process the service with the corresponding version in the application server. The application server 200 may remove a main memory which is allocated to the version of application which is identified based on the command to remove an unused version. The application server 200 may maintain the version of application identified based on the command to remove an unused version in a hard disk which is an auxiliary storage device without completing the installation and the storage. When the version of application which is identified based on a command to remove a version of application identified based on the command to remove an unused version is determined to be a removal standby state, the application server 200 may determine that it is ready to remove an unused version. The application server 200 may transmit the unused version removal readiness information for the version of application identified based on the command to remove an unused version to the application management server 100.

When the application management server 100 receives unused version removal readiness information for the same version of application from all the application servers 200, the application management server 100 may generate a command to confirm the removal of an unused version based on the unused version removal readiness information. The application management server 100 may transmit the command to confirm the removal of an unused version to all the application servers 200.

When the command to confirm the removal of an unused version is received from the application management server 100, the application server 200 terminates an instance for a version of application which is identified based on the command to confirm the removal of an unused version and retrieves an allocated main memory. The instance may be executing an application file to process the service with the corresponding version in the application server. The application server 200 may remove the version of application which is identified based on a command to confirm the removal of an unused version from the main memory. The application server 200 may remove the version of application which is identified based on the command to confirm the removal of an unused version from the storage medium. The application server 200 may terminate the installation and the storage of the version of application which is identified based on the command to confirm the removal of an unused version, in the hard disk which is an auxiliary device.

When the updated version of application includes all information of a new version of application to be deployed, the application server 200 may remove the entire corresponding files of the version of application identified based on the command to confirm the removal of an unused version from a hard disk which is an auxiliary storage device. When the updated version of application includes information to which only a difference of a new version of application to be deployed and a version of a previous deployed application is reflected, the application server 200 does not remove the entire file for the version of application identified based on the command to confirm the removal of an unused version, but adds the updated version and the unused version and files to maintain the installation and storage in the hard disk which is an auxiliary storage device.

Each service may be processed by calling different applications or different application servers in a synchronous manner or an asynchronous manner. The synchronous manner means a method that when one application server calls a service to other application server, the application server waits until a result for the called service is received. The asynchronous manner means a method that when one application server calls a service to other application server, the application server performs other service regardless of whether a result for the called service is received.

In the application server 200, the service may be performed in the synchronous manner. The first application server 200 may request the service to the second application server 201. The first application server 200 may not determine the application version with which the corresponding service is performed as an unused version until the processing completion for the service is received from the second application server 201 which requests the service.

In the application server 200, the service may be performed in the asynchronous manner. The first application server 200 may request the service to the second application server 201. When the command to remove an unused version is received, the first application server 200 may determine whether the service performed by a version of application identified based on the command to remove an unused version is transmitted to other application server. When the service performed by a version of application identified based on the command to remove an unused version is transmitted to the second application server 201, the first application server 200 may generate version unremovable information of the corresponding version. The first application server 200 may transmit version unremovable information to the application management server 100.

When the version unremovable information is received from at least one of the plurality of application servers 200, the application management server 100 may generate a command to cancel the removal of an unused version for the version of application identified based on the version unremovable information. The application management server 100 may transmit the command to cancel the removal of an unused version to all the application servers 200.

When the command to cancel the removal of an unused version is received from the application management server 100, the application server 200 may cancel a removal standby state for a version of application which is identified based on the command to cancel the removal of an unused version. When the command to cancel the removal of an unused version is received from the application management server 100, the application server 200 may cancel the termination of an instance for a version of application which is identified based on the command to cancel the removal of an unused version and the retrieval of the main memory.

An unnecessary version with which there is no service performed in the plurality of application servers 200 may be removed using a version management method for the plurality of application servers 200 of another exemplary embodiment of the present disclosure. The unnecessary version in the application server 200 is removed so that the memory 230 of the plurality of application servers 200 is efficiently used, thereby improving a service processing performance of the application server 200.

Figure 2:
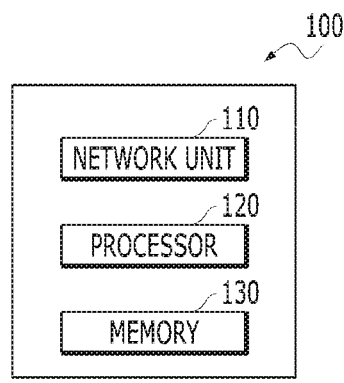
FIG. 2 is a view illustrating a block diagram of an application management server according to an exemplary embodiment of the present disclosure.

FIG. 2 is a view illustrating a block diagram of an application management server according to an exemplary embodiment of the present disclosure.

The application management server 100 may include a network unit 110, a processor 120, and a memory 130. The processor 120 reads a computer program stored in the memory 130 to perform application version hot deployment management according to an exemplary embodiment of the present disclosure.

The network unit 110 may include a transmitting unit and a receiving unit. The network unit includes a wired/wireless Internet module for network connection. As the wireless Internet technique, wireless LAN (WLAN) (Wi-Fi), wireless broadband (Wibro)), world interoperability for microwave access (Wimax), and high speed downlink packet access (HSDPA) may be used. As a wired Internet technique, a digital subscriber line (XDSL), fibers to the home (FTTH), and power line communication (PLC) may be used.

The network unit 110 includes a short range communication module to transmit and receive data to and from an electronic apparatus which is located in a relatively short range from the service processing device and includes a short range communication module. As a short range communication technology, a Bluetooth, a radio frequency identification (RFID), an infrared data association (IrDA), an ultra wideband (UWB), and a ZigBee may be used. In the exemplary embodiment of the present disclosure, the network unit may sense a network connection state and a network transmitting/receiving speed. Data received through the network unit may be stored in the memory or transmitted to other electronic apparatuses which are in a short range through the short range communication module.

The network unit 110 may receive an updated version of application file from an external computing device. The network unit 110 receives the updated version of application file from the external computing device to transmit the updated version of application file to the processor 120. The network unit 110 may transmit the updated version of application file and version information corresponding to the application file to each of the network units 210 of the plurality of application servers 200.

The network unit 110 may receive update readiness information of the same version of application from all the network units 210 of the plurality of application servers 200. When the network unit 120 receives the update readiness information of the same version of application from all the network units 210 of the plurality of application servers 200, the processor 120 may generate a command to apply the updated version of application. The network unit 110 may transmit the command to apply the updated version of application to each of the network units 210 of the plurality of application servers 200.

The network unit 110 may receive information on application failure of the updated version at least one of the network units 210 of the plurality of application servers 200. When the information on the application failure of the updated version is received from at least one of the plurality of application servers 200, the processor 120 may generate a command to cancel the application of the updated version. The network unit 110 may transmit the command to cancel the application of the updated version to each of the plurality of application servers 200.

The memory 130 may store whether the updated version of application is successfully deployed. The memory 130 may store the held application version information transmitted from the application server.

The processor 120 may be configured by one or more cores and may include a processor for data analysis or service processing such as a thread, a central processing unit (CPU) of a computing device, a general purpose graphics processing unit (GPGPU), and a tensor processing unit (TPU). The processor 120 reads a computer program stored in the memory 130 to perform a service processing method according to an exemplary embodiment of the present disclosure. Further, the computer program executed in the computing device according to the exemplary embodiment of the present disclosure may be a CPU, GPGPU, or TPU executable program.

The processor 120 reads a computer program stored in the memory 130 to perform seamless application version management according to an exemplary embodiment of the present disclosure.

The network unit 110 may receive unused version information for the same version of application to the application management server 100 from the network units 210 of all the application servers 200. The processor 120 may generate a command to remove an unused version based on the unused version information. The network unit 110 may transmit the command to remove an unused version to each of the network units 210 of all the application servers 200.

Figure 3:
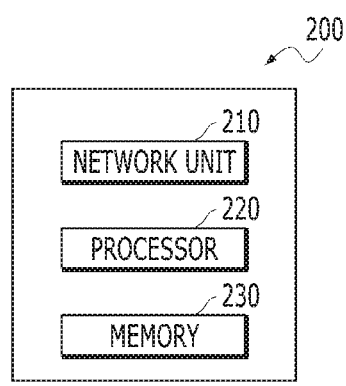
FIG. 3 is a view illustrating a block diagram of an application server according to an exemplary embodiment of the present disclosure.

The network unit 110 may receive unused version removal readiness information for the same version of application from the network units 210 of all the application servers 200. The processor 120 may generate a command to confirm the removal of an unused version based on the unused version removal readiness information. The network unit 110 may transmit the command to confirm the removal of an unused version to each of the network units 210 of all the application servers 200. FIG. 3 is a view illustrating a block diagram of an application server according to an exemplary embodiment of the present disclosure.

The application management server 200 may include a network unit 210, a processor 220, and a memory 230. The processor 220 reads a computer program stored in the memory 230 to perform application version hot deployment according to an exemplary embodiment of the present disclosure.

The network unit 210 may include a transmitting unit and a receiving unit. The network unit includes a wired/wireless Internet module for network connection. As the wireless Internet technique, wireless LAN (WLAN) (Wi-Fi), wireless broadband (Wibro)), world interoperability for microwave access (Wimax), and high speed downlink packet access (HSDPA) may be used. As a wired Internet technique, a digital subscriber line (XDSL), fibers to the home (FTTH), and power line communication (PLC) may be used.

The processor 220 may be configured by one or more cores and may include a processor for data analysis or service processing such as a thread, a central processing unit (CPU) of a computing device, a general purpose graphics processing unit (GPGPU), and a tensor processing unit (TPU). The processor 220 reads a computer program stored in the memory 230 to perform a service processing method according to an exemplary embodiment of the present disclosure. Further, the computer program executed in the computing device according to the exemplary embodiment of the present disclosure may be CPU, GPGPU, or TPU executable program.

The network unit 210 includes a short range communication module to transmit and receive data to and from an electronic apparatus which is located in a relatively short range from the service processing device and includes a short range communication module. As a short range communication technology, a Bluetooth, a radio frequency identification (RFID), an infrared data association (IrDA), an ultra wideband (UWB), and a ZigBee may be used. In the exemplary embodiment of the present disclosure, the network unit may sense a network connection state and a network transmitting/receiving speed. Data received through the network unit may be stored in the memory or transmitted to other electronic apparatuses which are in a short range through the short range communication module.

The network unit 110 may receive the updated version of application file and version information corresponding to the application file from the network unit 110 of the application management server 100. The memory 230 may store the updated version of application file and version information corresponding to the application file. When the corresponding version is requested for the service, the memory 230 may load an updated version of application file so as to process the service with the corresponding version. When the received updated version of application file is loaded to process the service, the processor 220 may generate application update readiness information. The network unit 210 may transmit the update readiness information to the network unit 110 of the application management server 100.

The network unit 210 may receive a command to apply the updated version from the network unit 110 of the application management server 100. The processor 220 may determine the updated version of application as a latest version. The processor 220 may perform a service which is received thereafter using the updated latest version of application.

When the determination fails due to a problem generated during a process of determining the updated version of application as a latest version, the processor 220 may determine that the application of the updated version fails. When the application of the updated version fails, the network unit 210 may transmit information on the application failure of the updated version to the network unit 110 of the application management server 100.

The network unit 210 may receive the command to cancel the application of the updated version from the network unit 110 of the application management server 100. The processor 220 may cancel the determination of the updated version of application as a latest version. The processor 220 may perform a service which is received thereafter using a version of application before being updated.

The memory 230 may record information on a plurality of versions of application. The memory 230 may record information on which service is performed for every version of application.

The processor 220 reads a computer program stored in the memory 230 to perform seamless application version management according to an exemplary embodiment of the present disclosure.

The network unit 210 may transmit at least one of held application version information, information on which service is performed for every version, and version information of an application which is performing a service to the network unit 110 of the application management server 100.

The processor 220 may determine whether there is a service which is performed by an application having a version other than the latest version among the plurality of versions of application. The processor 220 may determine a version of the application by which no service is performed as an unused version. The network unit 210 may transmit unused version information to the network unit 110 of the application management server 100. The processor 220 terminates an instance for a version of application which is identified based on the unused version information and retrieves an allocated main memory.

The network unit 210 may receive the command to remove an unused version from the network unit 110 of the application management server 100. The processor 220 may determine the version of application identified based on the received command to remove an unused version to be a removal standby state. The processor 220 terminates an instance for the version of application which is identified based on the received command to remove an unused version and retrieves an allocated main memory. When the version of application which is identified based on a command to remove a version of application identified based on the command to remove an unused version is determined to be a removal standby state, the processor 220 may determine that it is ready to remove an unused version. The network unit 210 may transmit unused version removal readiness information to the network unit 110 of the application management server 100.

The network unit 210 may receive the command to confirm the removal of an unused version from the network unit 110 of the application management server 100. The processor 220 terminates an instance for a version of application which is identified based on the command to confirm the removal of an unused version and retrieves an allocated main memory. The memory 230 may delete the version of application identified based on the command to confirm the removal of an unused version, from the memory 230.

Figure 4:
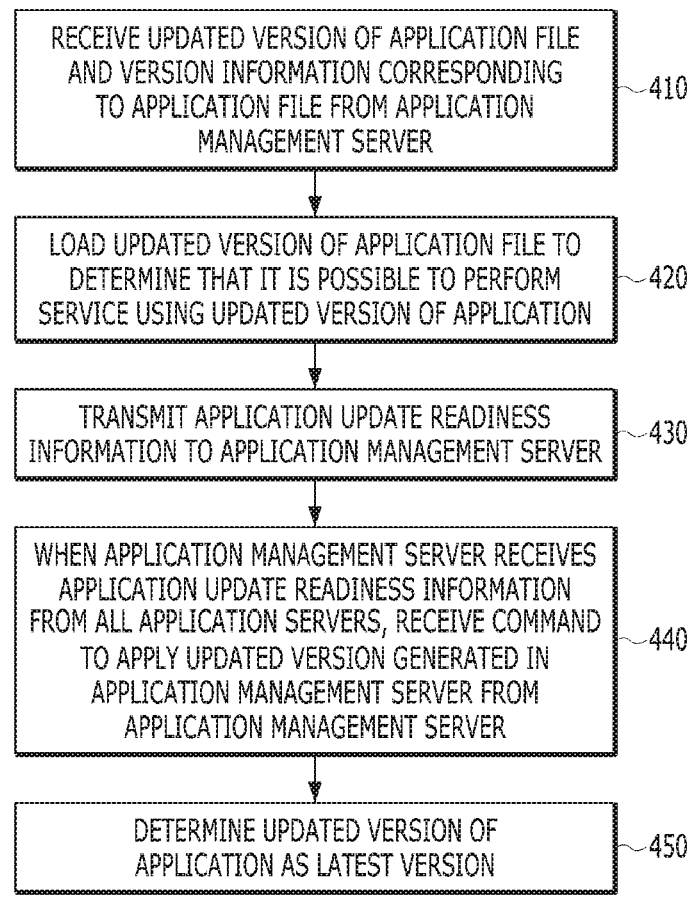
FIG. 4 is a flowchart for seamless application version management according to an exemplary embodiment of the present disclosure.

FIG. 4 is a flowchart for seamless application version management according to an exemplary embodiment of the present disclosure.

The application server 200 receives an updated version of application file and version information corresponding to the application file from the application management serve 100 in step 410.

The application server 200 loads the updated version of application file to determine that it is possible to perform a service using the updated version of application in step 420.

The application server 200 transmits application update readiness information to the application management server 100 in step 430.

When the application management server 100 receives the application update readiness information from all the application servers, the application server 200 receives a command to apply the updated version generated in the application management server 100, from the application management serve 100 in step 440.

The application server 200 determines the updated version of application to be a latest version in step 450.

Figure 5:
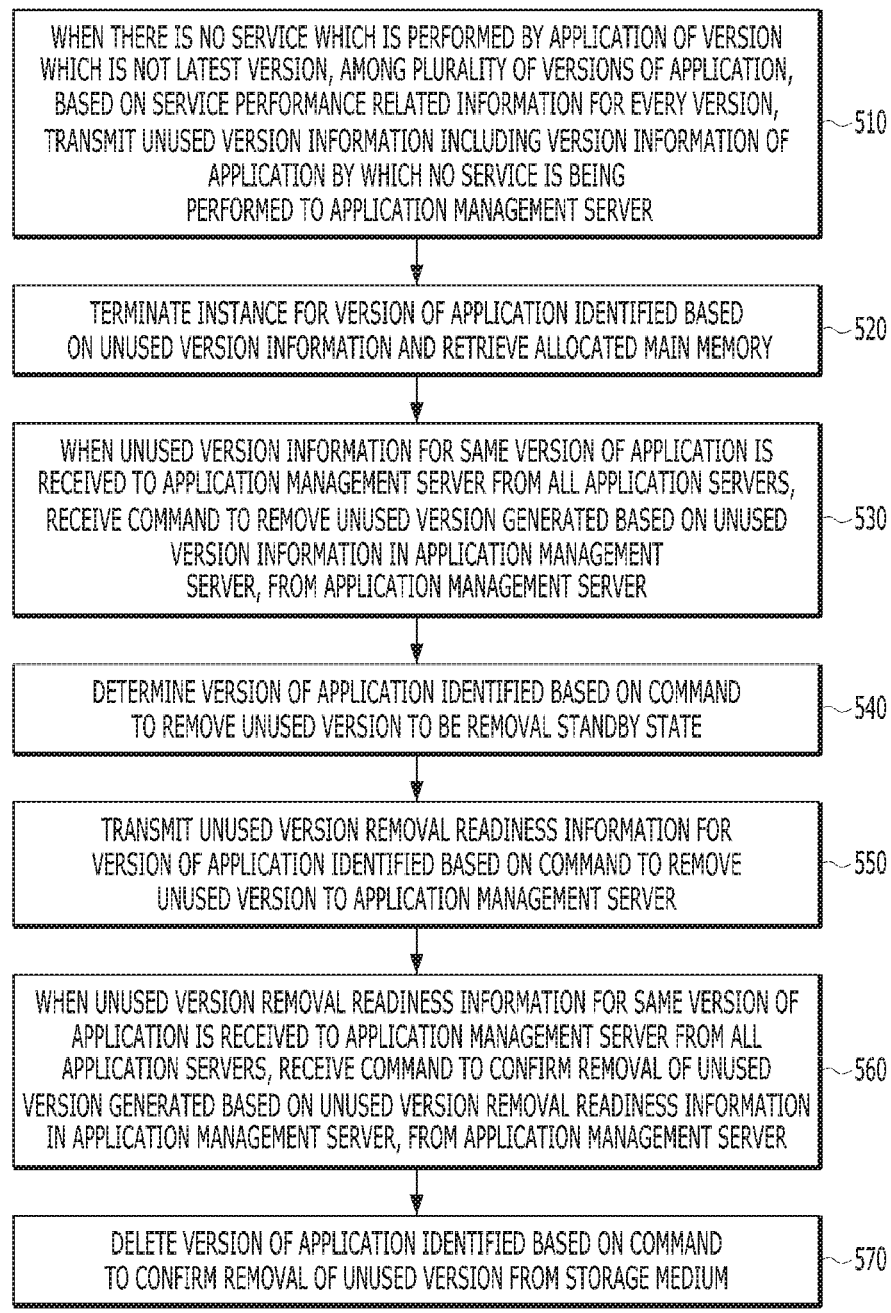
FIG. 5 is a flowchart for seamless application version management according to another exemplary embodiment of the present disclosure.

FIG. 5 is a flowchart for seamless application version removal according to an exemplary embodiment of the present disclosure.

As a system 10 for seamless application version management, the application server 200 transmits unused version information including version information of an application by which no service is being performed to the application management server 100 in step 510 when there is no service which is performed by a version of application which is not a latest version, among the plurality of versions of application, based on service performance related information for every version.

The application server 200 terminates an instance for a version of application which is identified based on the unused version information and retrieves an allocated main memory in step 520.

When unused version information for the same version of application is received to the application management server 100 from all the application servers, the application server 200 receives the command to remove an unused version generated based on the unused version information in the application management server 100, from the application management server 100 in step 530.

The application server 200 determines the version of application identified based on the command to remove an unused version to be a removal standby state in step 540.

The application server 200 transmits the unused version removal readiness information for the version of application identified based on the command to remove an unused version to the application management server 100 in step 550.

When unused version removal readiness information for the same version of application is received to the application management server 100 from all the application servers, the application server 200 may receive the command to confirm the removal of an unused version generated based on the unused version removal readiness information in the application management server 100, from the application management server 100 in step 560.

The application server 200 deletes the version of application identified based on the command to confirm the removal of an unused version from the storage medium in step 570.

Figure 6:
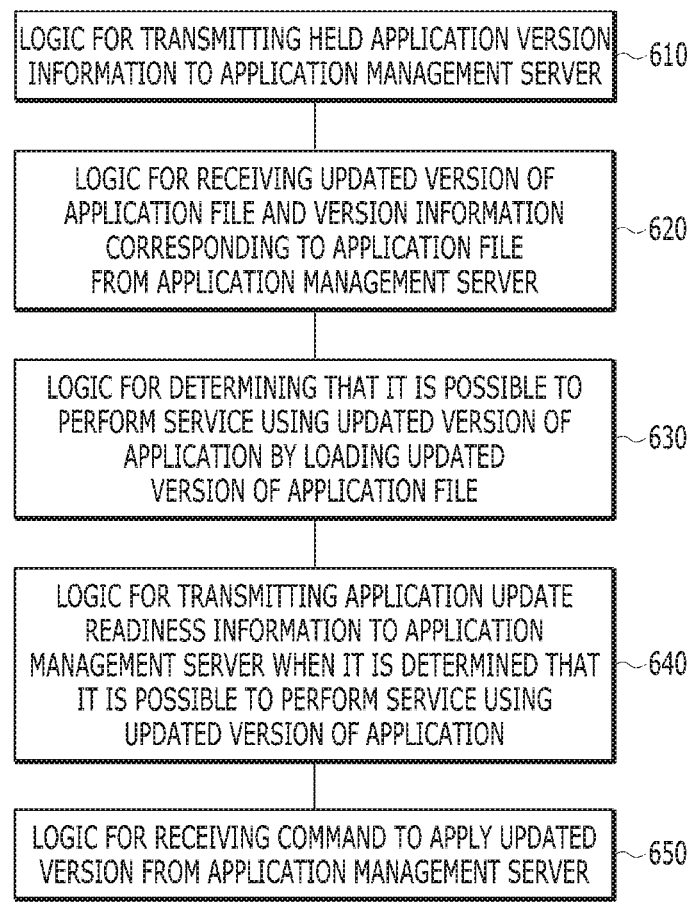
FIG. 6 is a block diagram illustrating a logic for seamless application version management according to an exemplary embodiment of the present disclosure.

FIG. 6 is a block diagram illustrating a logic for seamless application version management according to an exemplary embodiment of the present disclosure.

A method for seamless application version management according to an exemplary embodiment of the present disclosure may be implemented by the following logics.

A method for seamless application version management according to an exemplary embodiment of the present disclosure may include a logic 610 for transmitting held application version information to an application management server by an application server; a logic 620 for receiving an updated version of application file and version information corresponding to the application file from the application management server, by the application server; a logic 630 for determining that it is possible to perform the service using the updated version of application by loading the updated version of application file, by the application server; a logic 640 for transmitting application update readiness information to the application management server, by the application server, when it is determined that it is possible to perform the service using the updated version of application; and a logic 650 for receiving a command to apply the updated version from the application management server, by the application server.

Figure 7:
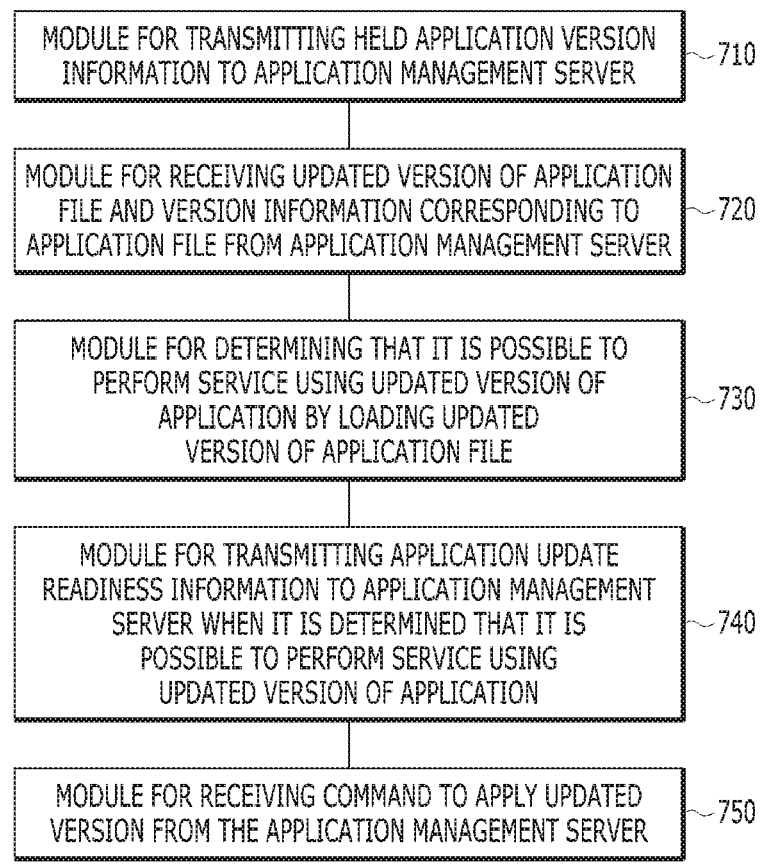
FIG. 7 is a block diagram illustrating a module for seamless application version management according to an exemplary embodiment of the present disclosure.

FIG. 7 is a block diagram illustrating a module for seamless application version management according to an exemplary embodiment of the present disclosure. The method for seamless application version management according to an exemplary embodiment of the present disclosure may be implemented by the following modules.

A method for seamless application version management according to an exemplary embodiment of the present disclosure may include a module 710 for transmitting held application version information to an application management server by an application server; a module 720 for receiving an updated version of application file and version information corresponding to the application file from the application management server, by the application server; a module 730 for determining that it is possible to perform the service using the updated version of application by loading the updated version of application file, by the application server; a module 740 for transmitting application update readiness information to the application management server, by the application server, when it is determined that it is possible to perform the service using the updated version of application; and a module 750 for receiving a command to apply the updated version from the application management server, by the application server.

Figure 8:
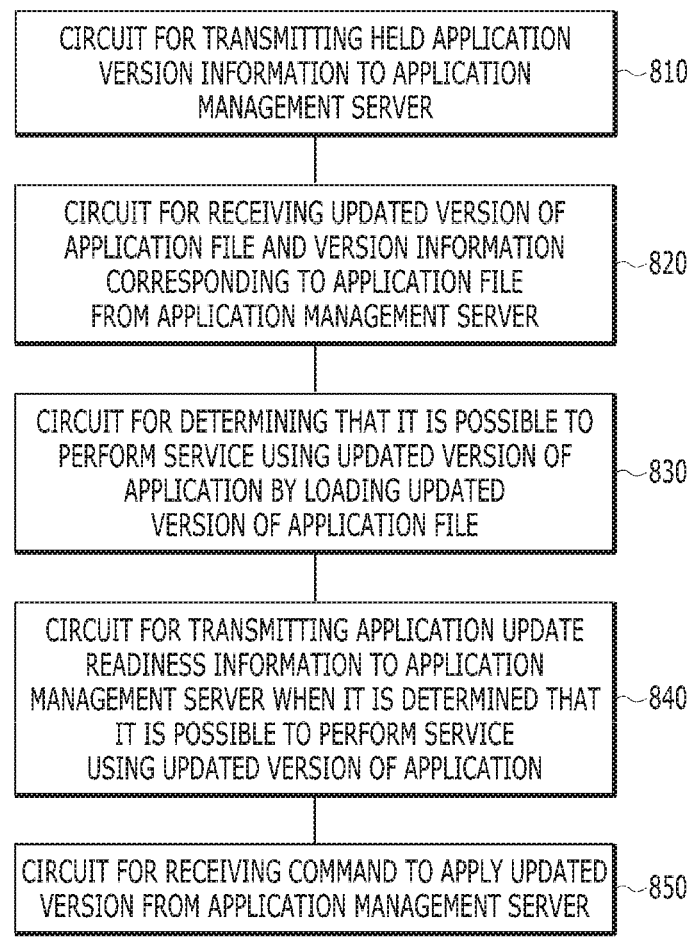
FIG. 8 is a block diagram illustrating a circuit for seamless application version management according to an exemplary embodiment of the present disclosure.

FIG. 8 is a block diagram illustrating a circuit for seamless application version management according to an exemplary embodiment of the present disclosure.

The method for seamless application version management according to an exemplary embodiment of the present disclosure may be implemented by the following circuits.

A method for seamless application version management according to an exemplary embodiment of the present disclosure may include a circuit 810 for transmitting held application version information to an application management server by an application server; a circuit 820 for receiving an updated version of application file and version information corresponding to the application file from the application management server, by the application server; a circuit 830 for determining that it is possible to perform the service using the updated version of application by loading the updated version of application file, by the application server; a circuit 840 for transmitting application update readiness information to the application management server, by the application server, when it is determined that it is possible to perform the service using the updated version of application; and a circuit 850 for receiving a command to apply the updated version from the application management server, by the application server.

Figure 9:
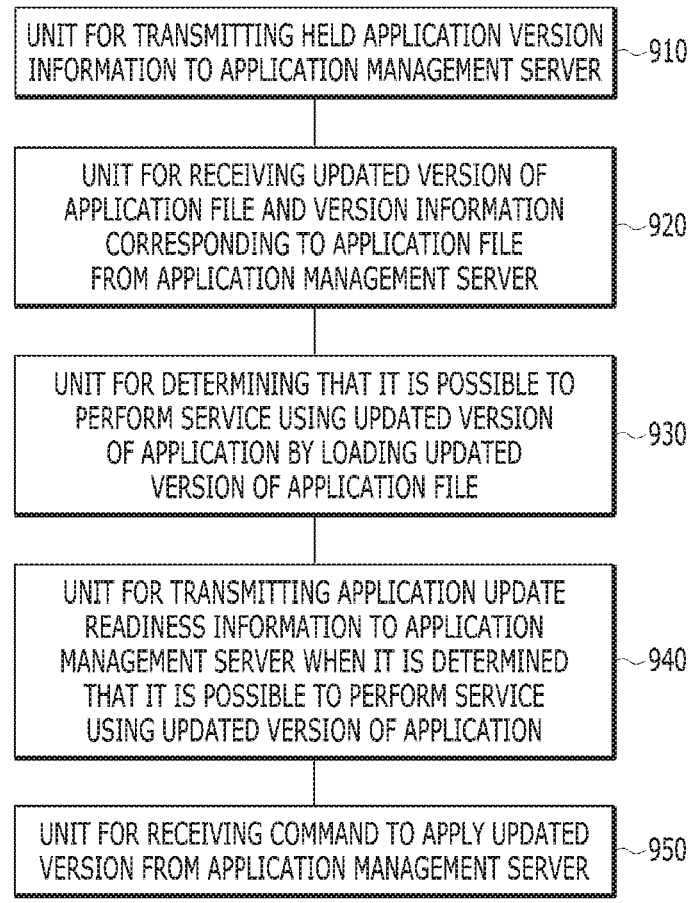
FIG. 9 is a block diagram illustrating a unit for seamless application version management according to an exemplary embodiment of the present disclosure.

FIG. 9 is a block diagram illustrating a unit for seamless application version management according to an exemplary embodiment of the present disclosure;

The method for seamless application version management according to an exemplary embodiment of the present disclosure may be implemented by the following units.

A method for seamless application version management according to an exemplary embodiment of the present disclosure may include a unit 910 for transmitting held application version information to an application management server by an application server; a unit 920 for receiving an updated version of application file and version information corresponding to the application file from the application management server, by the application server; a unit 930 for determining that it is possible to perform the service using the updated version of application by loading the updated version of application file, by the application server; a unit 940 for transmitting application update readiness information to the application management server, by the application server, when it is determined that it is possible to perform the service using the updated version of application; and a unit 950 for receiving a command to apply the updated version from the application management server, by the application server.

Figure 10:
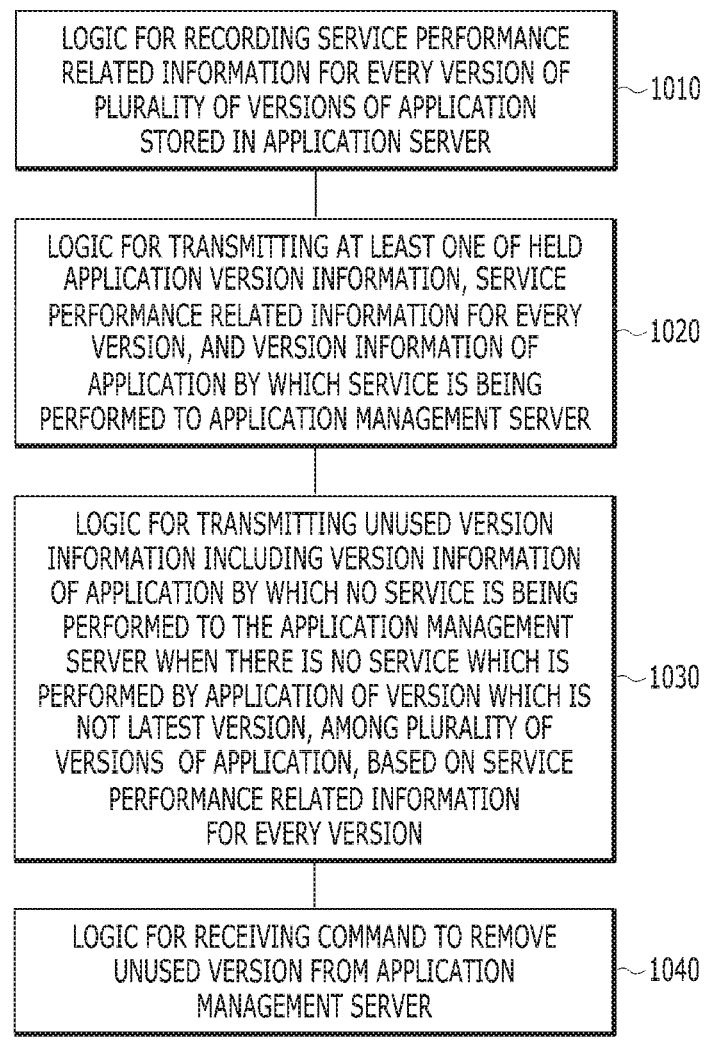
FIG. 10 is a block diagram illustrating a logic for seamless application version management according to another exemplary embodiment of the present disclosure.

FIG. 10 is a block diagram illustrating a logic for seamless application version management according to another exemplary embodiment of the present disclosure.

The method for seamless application version management according to an exemplary embodiment of the present disclosure may be implemented by the following logics.

A method for seamless application version management according to another exemplary embodiment of the present disclosure includes a logic 1010 for recording service performance related information for every version of a plurality of versions of application stored in an application server, by the application server; a logic 1020 for transmitting at least one of the held application version information, the service performance related information for every version, and version information of an application by which the service is being performed, to the application management server, by the application server; a logic 1030 for transmitting unused version information including version information of an application by which no service is being performed to the application management server, by the application server, when there is no service which is performed by a version of application which is not a latest version, among the plurality of versions of application, based on the service performance related information for every version; and a logic 1040 for receiving a command to remove an unused version from the application management server, by the application server.

Figure 11:
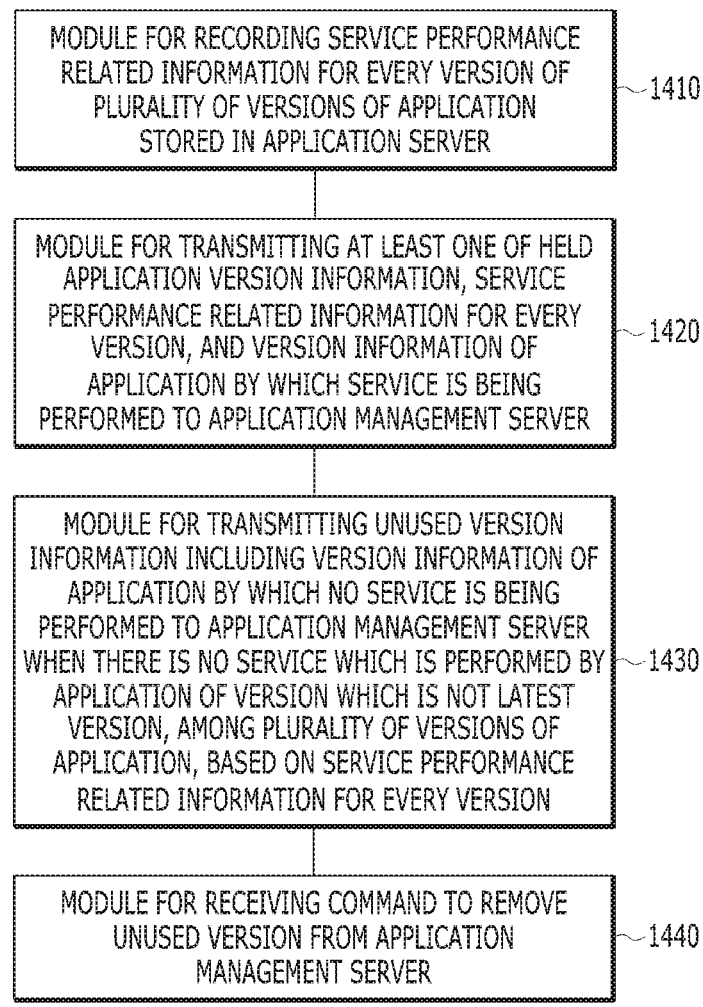
FIG. 11 is a block diagram illustrating a module for seamless application version management according to another exemplary embodiment of the present disclosure.

FIG. 11 is a block diagram illustrating a module for seamless application version management according to another exemplary embodiment of the present disclosure.

The method for seamless application version management according to another exemplary embodiment of the present disclosure may be implemented by the following modules.

A method for seamless application version management according to an exemplary embodiment of the present disclosure includes a module 1410 for recording service performance related information for every version of a plurality of versions of application stored in an application server, by the application server; a module 1420 for transmitting at least one of the held application version information, the service performance related information for every version, and version information of an application by which the service is being performed, to the application management server, by the application server; a module 1430 for transmitting unused version information including version information of an application by which no service is being performed to the application management server, by the application server, when there is no service which is performed by a version of application which is not a latest version, among the plurality of versions of application, based on the service performance related information for every version; and a module 1440 for receiving a command to remove an unused version from the application management server, by the application server.

Figure 12:
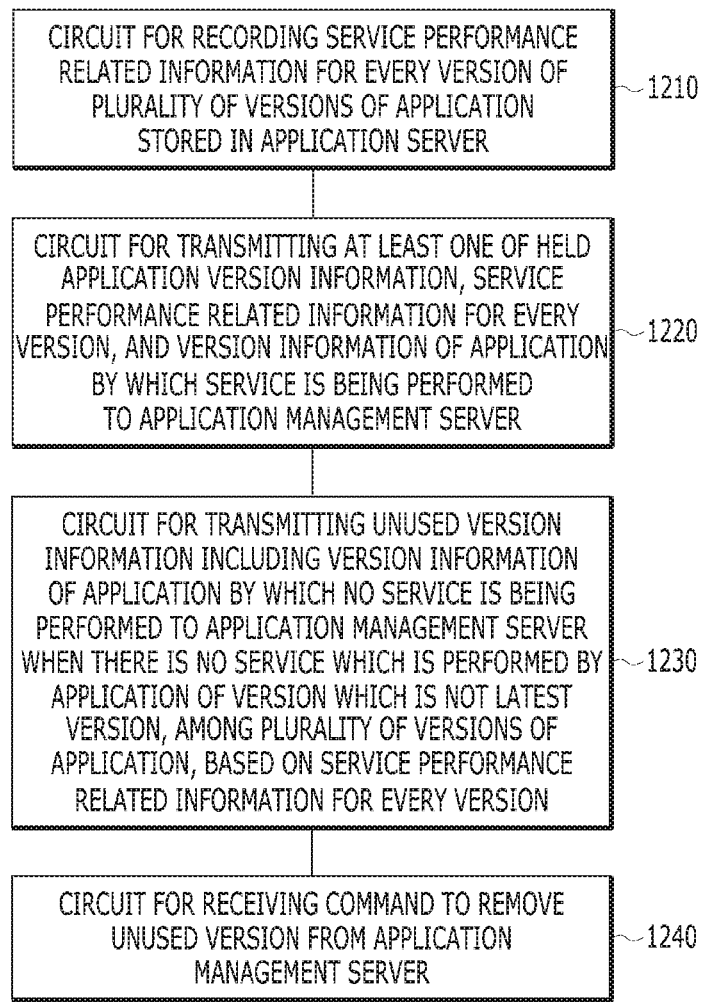
FIG. 12 is a block diagram illustrating a circuit for seamless application version management according to another exemplary embodiment of the present disclosure.

FIG. 12 is a block diagram illustrating a circuit for seamless application version management according to another exemplary embodiment of the present disclosure.

The method for seamless application version management according to another exemplary embodiment of the present disclosure may be implemented by the following circuits.

A method for seamless application version management according to another exemplary embodiment of the present disclosure includes a circuit 1210 for recording service performance related information for every version of a plurality of versions of application stored in an application server, by the application server; a circuit 1220 for transmitting at least one of the held application version information, the service performance related information for every version, and the version information of an application by which the service is being performed to the application management server, by the application server; a circuit 1230 for transmitting unused version information including the version information of an application by which no service is being performed to the application management server, by the application server, when there is no service which is performed by a version of application which is not a latest version, among the plurality of versions of application, based on the service performance related information for every version; and a circuit 1240 for receiving a command to remove an unused version from the application management server, by the application server.

Figure 13:
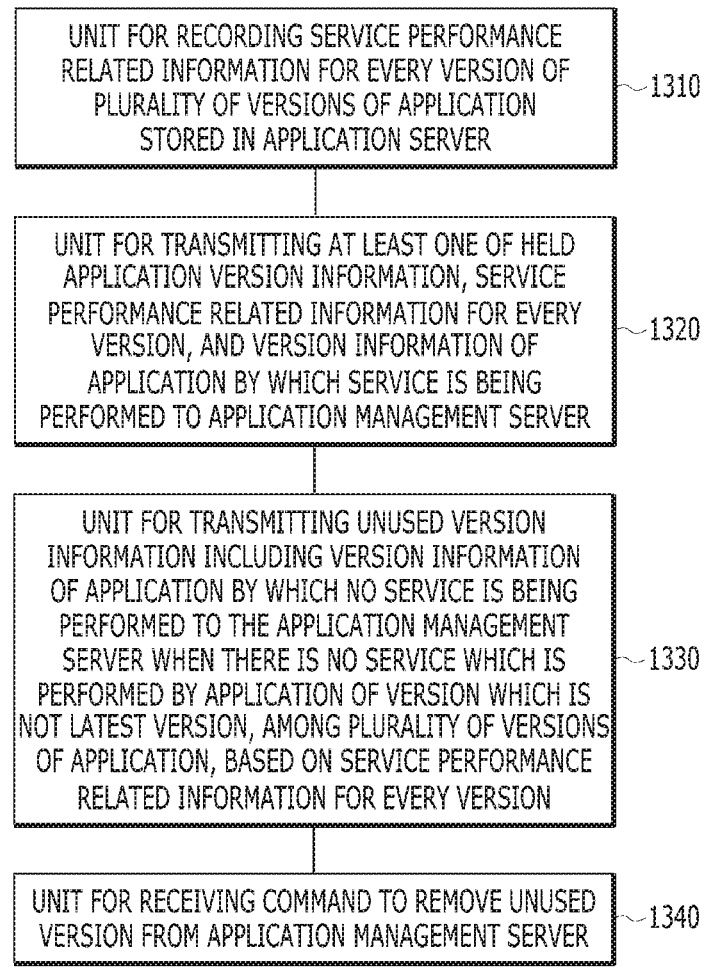
FIG. 13 is a block diagram illustrating a unit for seamless application version management according to another exemplary embodiment of the present disclosure.

FIG. 13 is a block diagram illustrating a unit for seamless application version management according to another exemplary embodiment of the present disclosure.

The method for seamless application version management according to another exemplary embodiment of the present disclosure may be implemented by the following units.

A method for seamless application version management according to another exemplary embodiment of the present disclosure includes a unit 1310 for recording service performance related information for every version of a plurality of versions of application stored in an application server, by the application server; a unit 1320 for transmitting at least one of the held application version information, the service performance related information for every version, and the version information of an application by which the service is being performed to the application management server, by the application server; a unit 1330 for transmitting unused version information including the version information of an application by which no service is being performed to the application management server, by the application server, when there is no service which is performed by a version of application which is not a latest version, among the plurality of versions of application, based on the service performance related information for every version; and a unit 1340 for receiving a command to remove an unused version from the application management server, by the application server.

Figure 14:
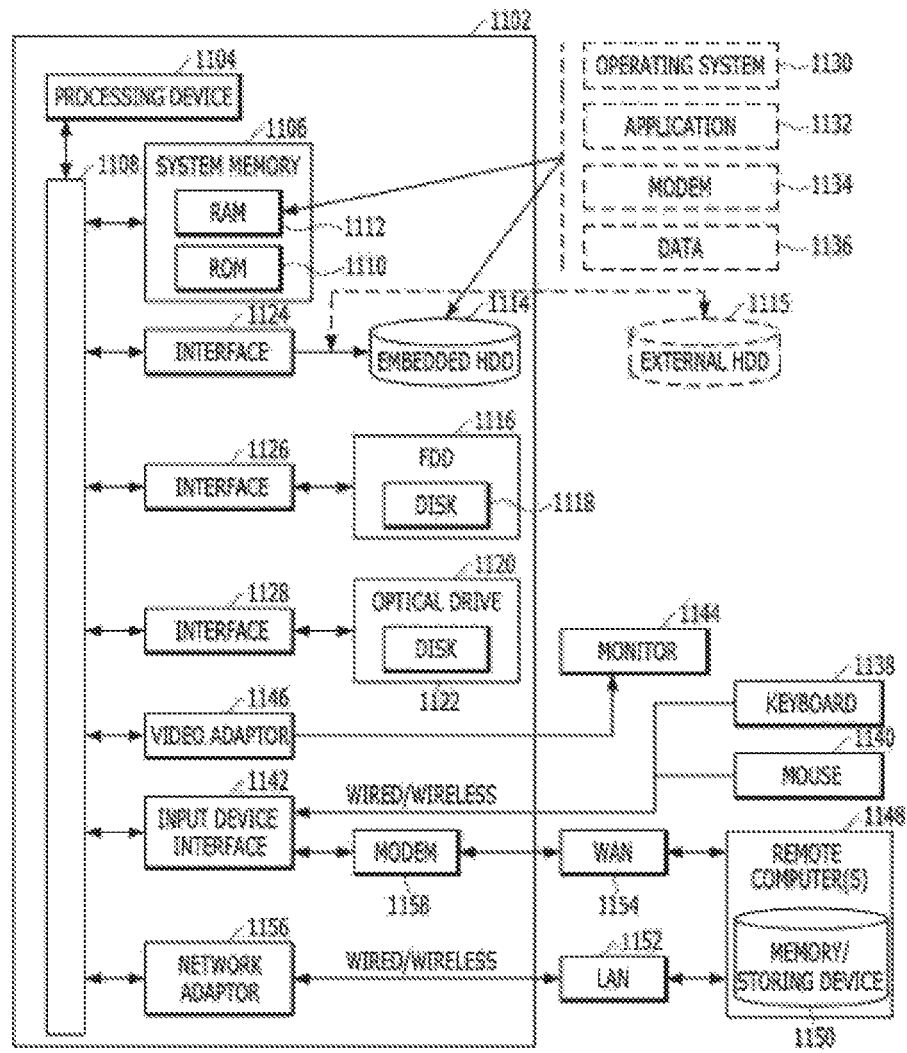
FIG. 14 is a block diagram of a computing system according to an exemplary embodiment of the present disclosure.

FIG. 14 is a block diagram of a computing system according to an exemplary embodiment of the present disclosure.

FIG. 14 illustrates a simple and general schematic view of an exemplary computing environment in which exemplary embodiments of the present disclosure are embodied.

Generally, even though the present disclosure is described in regard to a computer executable instruction which can be executable on one or more computers, it is obvious to those skilled in the art that the present disclosure may be implemented by being coupled with other program modules and/or a combination of hardware and software.

Generally, the program module includes a routine, a program, a component, a data structure, or the like which performs a specific task or implements a specific abstract data type. Further, those skilled in the art may understand that the method of the present disclosure may be embodied not only by a single processor or a multi-processor computer system, a mini computer, and a main frame computer, but also a personal computer, a hand-held computing apparatus, microprocessor based or programmable home appliances (which may be connected to one or more related devices to be operated), and other computer system configurations.

The described exemplary embodiments of the present disclosure may also be embodied in a distributed computing environment in which some tasks are performed by remote processing devices which are connected to each other through a communication network. In the distributed computing environment, a program module may be located in both local and remote memory storing devices.

Generally, a computer includes various computer readable media. Any of media accessible by a computer may be computer readable media. The computer readable medium includes volatile and non-volatile media, transitory and non-transitory media, and mobile and non-mobile media. As an example which is not limitation, the computer readable medium may include a computer readable storage medium and a computer readable transmission medium. The computer readable storage medium includes a volatile or non-volatile medium, a transitory or non-transitory medium, and a mobile or a non-mobile medium which are implemented by an arbitrary method or technique which stores information such as a computer readable instruction, a data structure, a program module or other data. The computer storage medium includes a RAM, a ROM, an EEPROM, a flash memory, or other memory techniques, a CD-ROM, a digital video disk (DVD), or other optical disk storing devices, a magnetic cassette, a magnetic tape, a magnetic disk storing device, or other magnetic storing devices, or other arbitrary media which are accessed by a computer and are used to store desired information, but is not limited thereto.

The computer readable transmission medium generally implements a computer readable instruction, a data structure, a program module, or other data in a modulated data signal such as a carrier waver or other transport mechanism and includes all information transfer medium. A term "modulated data signal" refers to a signal in which one or more properties of the signal are set or changed to encode information in the signal. As an example which is not limitation, a computer readable transmission medium includes a wired medium such as a wired network or direct wired connection and a wireless medium such as sound, RF, infrared ray, or other wireless medium. It is considered that a combination of any of the above-mentioned media may also be included in the scope of the computer readable transmission medium.

An exemplary environment 1100 including a computer 1102 which implements various aspects of the present disclosure is illustrated and the computer 1102 includes a processing device 1104, a system memory 1106, and a system bus 1108. The system bus 1108 connects system components including a system memory 1106 (not to be limited thereto) to the processing device 1104. The processing device 1104 may be an arbitrary processor among various commercial processors. A dual processor and other multiprocessor architectures may also be used as the processing device 1104.

The system bus 1108 may be any of several types of bus structures which is additionally connected to a local bus which uses any of a memory bus, a peripheral device bus, and various commercial bus architectures. The system memory 1106 includes a read only memory (ROM) 1110 and a random access memory (RAM) 1112. A basic input/output system (BIOS) is stored in a non-volatile memory 1110 such as a ROM, an EPROM, and an EEPROM and the BIOS includes a basic routine which assists to transmit information between components in the computer 1102 while the computer is activated. The RAM 1112 may further include a fast RAM such as a static RAM for caching data.

The computer 1102 further includes an embedded hard disk drive (HDD) 1114 (for example, EIDE, SATA) which may also be configured as an external drive in an appropriate chassis (not illustrated), a magnetic floppy disk drive (FDD) 1116 (for example, to read data from a portable diskette 1118 or record data therein), and an optical disk driver 1120 (for example, to read a CD-ROM disk 1122 or read data from other high quantity optical medium such as a DVD or record data therein). The hard disk drive 1114, the magnetic disk drive 1116, the optical disk drive 1120 may be connected to the system bus 1108 through a hard disk drive interface 1124, a magnetic disk drive interface 1126, and an optical drive interface 1128. The interface 1124 for implementing an external drive includes at least one or both of universal serial bus (USB) and IEEE 1394 interface technique.

These drives and a computer readable medium related therewith provide non-volatile storage of data, a data structure, a computer executable instruction, or the like. In the case of the computer 1102, the drive and the medium correspond to storing arbitrary data as an appropriate digital type. In the description of the computer readable medium, an HDD, a portable magnetic disk, and a portable optical medium such as a CD or a DVD have been mentioned. However, it is well known to those skilled in the art that other types of computer readable media such as a zip drive, a magnetic cassette, a flash memory card, a cartridge, or the like may also be used in an exemplary operating environment and the arbitrary medium may include a computer executable instruction which performs the methods of the present disclosure.

A large number of program modules including an operating system 1130, one or more application programs 1132, other program module 1134, and program data 1136 may be stored in the drive and the RAM 1112. The operating system, the application, the module and/or all or a part of data are also cached by the RAM 1112. It is obvious that the present disclosure may be implemented by various commercially applicable operating systems or a combination of operating systems.

A user may input a command and information to the computer 1102 through one or more wired/wireless input devices, for example, a pointing device such as a keyboard 1138 and a mouse 1140. Other input device (not illustrated) may include a microphone, an IR remote controller, a joystick, a game pad, a stylus pen, a touch screen, or the like. These and other input devices are sometimes connected to the processing device 1104 through an input device interface 1142 which is connected to the system bus 1108, but may be connected by a parallel port, an IEEE 1394 serial port, a game port, a USB port, an IR interface, or other interfaces.

A monitor 1144 or other type of display device is also connected to the system bus 1108 through an interface such as a video adaptor 1146. In addition to the monitor 1144, a computer generally includes other peripheral output devices (not illustrated) such as a speaker or a printer.

The computer 1102 may operate in a networked environment using logical connection of remote computer(s) 1148 to one or more remote computers through wired and/or wireless communication. The remote computer(s) 1148 may be a workstation, a computing device computer, a router, a personal computer, a portable computer, a microprocessor based amusement machine, a peer device, or other general network node and generally, includes a large number of or all the components which have been described for the computer 1102. However, for the purpose of simplicity, only a memory storing device 1150 is illustrated. The illustrated logical connection includes wired/wireless connection to a local area network (LAN) 1152 and/or larger network, for example, a wide area network (WAN) 1154. The LAN and WAN networking environments are general in an office and a company and facilitate enterprise-wide computer network such as Intranet and these are all connected to a worldwide computer network, for example, Internet.

When the computer 1102 is used in the LAN networking environment, the computer 1102 is connected to a local network 1152 through a wired and/or wireless communication network interface or an adaptor 1156. The adaptor 1156 allows wired or wireless communication to the LAN 1152 and the LAN 1152 also includes a wireless access point provided therein to communicate with the wireless adaptor 1156. When the computer 1102 is used in the WAN networking environment, the computer 1102 has other means, for example, includes a modem 1158 or is connected to a communication computing device on the WAN 1154, or uses Internet to set communication through the WAN 1154. The modem 1158 which may be an embedded or external, and wired or wireless device is connected to the system bus 1108 through the serial port interface 1142. In a networked environment, program modules described for the computer 1102 or a part thereof may be stored in the remote memory/storing device 1150. It is understood that the illustrated network connection is an example and other means to set a communication link between computers may be used.

The computer 1102 performs operations to communicate with an arbitrary wireless device or entity which is disposed through wireless communication to operate, for example, a printer, a scanner, a desktop and/or portable computer, a portable data assistant (PDA), a communication satellite, arbitrary equipment or location related with a wireless detectable tag, and a telephone. This includes at least Wi-FI and Bluetooth wireless technology. Therefore, communication may be a previously defined structure such as a network of the related art or simply ad hoc communication between at least two devices.

Wi-Fi (wireless fidelity) may allow connection to the Internet without using a wire. The Wi-Fi is a wireless technique such as a cell phone which allows such a device, for example, a computer to transmit and receive data indoor and outdoor, that is, in any place within a coverage of a base station. The Wi-Fi network uses a wireless technology called IEEE 802.11 (a, b, g, or the like) to provide safe, reliable, and fast wireless connection. Wi-Fi may be used to connect computers to each other or to the Internet, and a wired network (IEEE 802.3 or Ethernet is used). The Wi-Fi network operates, for example, at a 11 Mbps (802.11a) or 54 Mbps (802.11b) data rate in an unauthorized wireless band of 2.4 and 5 GHz or operates in a product including both bands (dual band).

Those skilled in the art may understand that information and signals may be represented using various arbitrary technologies and techniques. For example, data, indications, commands, information, signals, bits, symbols, and chips which may be referred in the above description may be represented by voltages, currents, electromagnetic waves, magnetic fields or particles, optical fields or particles, or an arbitrary combination thereof.

Those skilled in the art may understand that various exemplary logical blocks, modules, processors, units, circuits, and algorithm steps which have been described with respect to the exemplary embodiments disclosed herein may be implemented by electronic hardware, various types of programs (for the convenience, referred to as "software" here), a design code, or a combination thoseof. In order to clearly describe compatibility of hardware and software, various exemplary components, blocks, modules, circuits, and steps are generally described above with respect to functions thoseof. Whether these functions are implemented as hardware or software is determined depending on design restrictions which are applied to a specific application and the entire system. Those skilled in the art may implement the function, which is described by various methods, of the specific application but the implementation determination is not interpreted to depart from the scope of the present disclosure.

Various exemplary embodiments suggested herein may be implemented by a method, a device, or a standard programming and/or an article using an engineering technique. A term "article" includes a computer program which is accessible from an arbitrary computer readable device, a carrier or a media. For example, the computer readable medium includes a magnetic storing device (for example, a hard disk, a floppy disk, or a magnetic strip), an optical disk (for example, a CD or a DVD), a smart card, and a flash memory device (for example, an EEPROM, a card, a stick, or a key drive), but is not limited thereto. Further, various storage media suggested herein include one or more devices for storing information and/or other machine readable medium.

It should be understood that a specific order or a hierarchical structure of steps in suggested processes are examples of exemplary approaches. It should be understood that a specific order or a hierarchical structure of steps in the processes may be rearranged within the scope of the present disclosure, based on a design priority. The accompanying method claims provide elements of various steps in the order of sample, but the claims are not meant to be limited to the suggested specific order or hierarchical structure.

Description of the suggested exemplary embodiment is provided to allow those skilled in the art to use or embody the present disclosure. Various modifications to these embodiments may be apparent to those skilled in the art. Generic principles defined herein may be applied to other embodiments without departing from the scope of the present disclosure. Therefore, the present disclosure is not limited to the exemplary embodiments suggested herein, but interpreted in the broadest range which is consistent with principles suggested herein and new features.

What is claimed is:

1. A non-transitory computer readable storage medium for seamless application version management of a plurality of application servers that includes at least a first application server and a second application server, wherein the non-transitory computer readable storage medium comprises a computer program that comprises instructions for:
    the first application server transmitting held application version information to an application management server;
    the first application server receiving an updated version of an application file and version information corresponding to the application file from the application management server;
    the first application server transmitting application update readiness information to the application management server when it is determined that it is ready to perform a service using the updated version of the application;
    the first application server applying the updated version of the application in response to receiving a command to apply the updated version from the application management server;
    the first application server canceling the applied updated version of the application in response to receiving, from the application management server, a command to cancel the application of the updated version, after the application management server receives an application failure information of the updated version from the second application server
    the first application server receiving a service from another application server; and
    the first application server performing the service using a version of the application identified based on the version information of the service when there is version information in the service or performing the service using a latest version of the application when there is no version information in the service.

2. The non-transitory computer readable storage medium according to claim 1, wherein the command to apply the updated version is generated in the application management server when the application update readiness information is received from all application servers of a system including at least the first application server and a second application server to the application management server.

3. The non-transitory computer readable storage medium according to claim 1, wherein the procedures further include:

the first application server transmitting application failure information of the updated version to the application management server when the application of the updated version fails;

the first application server receiving the command to cancel the application of the updated version from the application management server; and the first application server performing a service using an older version of the application of the updated version.

4. The non-transitory computer readable storage medium according to claim 1, wherein the procedures further include:

the first application server determining the updated version of the application as a latest version when a command to apply the updated version is received from the application management server; and the first application server performing a service after receiving the command to apply the updated version using the updated version of the application.

5. A method for seamless application version management in a system including at least a first application server and a second application server, the method comprising:

the first application server transmitting held application version information to an application management server, the first application server receiving an updated version of an application file and version information corresponding to the application file from the application management server;

the first application server transmitting application update readiness information to the application management server when it is determined that it is ready to perform the service using the updated version of the application;

the first application server applying the updated version of the application in response to receiving a command to apply the updated version from the application management server;

the first application server canceling the applied updated version of the application in response to receiving, from the application management server, a command to cancel the application of the updated version, after the application management server receives an application failure information of the updated version from the second application server;

the first application server receiving a service from another application server; and the first application server performing the service using a version of the application identified based on the version information of the service when there is version information in the service or performing the service using a latest version of the application when there is no version information in the service.

6. An application server for seamless application version management in a system including at least a first application server and a second application server, the application server comprising:

a processor including one or more cores; and a memory;

wherein the processor is configured so that:

the first application server transmits held application version information to an application management server, the first application server receives an updated version of an application file and version information corresponding to the application file from the application management server;

the first application server transmits application update readiness information to the application management server when it is determined that it is ready to perform the service using the updated version of the application;

the first application server applies the updated version of the application in response to receiving a command to apply an updated version from the application management server;

the first application server cancels the applied updated version of the application in response to receiving, from the application management server, a command to cancel the application of the updated version, after the application management server receives an application failure information of the updated version from the second application server;

the first application server receiving a service from another application server; and the first application server performing the service using a version of the application identified based on the version information of the service when there is version information in the service or performing the service using a latest version of the application when there is no version information in the service.

* * * * *